(12) United States Patent
Kim et al.

(10) Patent No.: US 7,400,370 B2
(45) Date of Patent: Jul. 15, 2008

(54) ONE PIXEL FULL COLOR DISPLAY DEVICE USING CHOLESTERIC MIXTURE

(75) Inventors: Mu Gyeom Kim, Gyeonggi-Do (KR); Wo Jae Woo, Gyeonggi-Do (KR); Jong Jin Park, Gyeonggi-Do (KR); Jong Ho Son, Seoul (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 355 days.

(21) Appl. No.: 11/201,089

(22) Filed: Aug. 11, 2005

(65) Prior Publication Data

US 2006/0050204 A1  Mar. 9, 2006

(51) Int. Cl.
*G02F 1/1335* (2006.01)
(52) U.S. Cl. ...................... 349/115; 349/141
(58) Field of Classification Search ............... 349/115, 349/139–141
See application file for complete search history.

(56) References Cited

U.S. PATENT DOCUMENTS

| | | | |
|---|---|---|---|
| 6,549,261 B1 | 4/2003 | Okada et al. | |
| 6,580,482 B1 | 6/2003 | Hiji et al. | |
| 6,580,483 B2 * | 6/2003 | Suzuki et al. | 349/115 |
| 6,693,689 B1 | 2/2004 | Kim et al. | |
| 6,825,903 B2 * | 11/2004 | Ohtake et al. | 349/115 |
| 6,842,210 B2 * | 1/2005 | Hashimoto et al. | 349/115 |
| 7,075,604 B2 * | 7/2006 | Yano et al. | 349/117 |

\* cited by examiner

*Primary Examiner*—David Nelms
*Assistant Examiner*—John Heyman
(74) *Attorney, Agent, or Firm*—Buchanan Ingersoll & Rooney PC

(57) ABSTRACT

A LCD device (200) is disclosed that has a cholesteric compound layer (205), a backplane light (201), and one or more polarizers (203, 209) and liquid crystal smectic C* layers. The cholesteric compound layer (205) transmits elliptically polarized light having an amount of absorbance which is related to the angular rotation of the polarization. One or more of the liquid crystal smectic C* layers may be controlled as a polarization filter to select the apparent color of the transmitted light.

26 Claims, 5 Drawing Sheets

Left-handed Cholesteric

Right-handed Chiral Dopant and Copolymer Dopant

Left-handed Chiral Dopant

ONE PIXEL FULL COLOR DISPLAY DEVICE USING CHOLESTERIC MIXTURE

BACKGROUND

1. Field of the Invention

The present invention is related to a display device, and more particularly to a liquid crystal display using a cholesteric mixture.

2. Discussion of Related Art

Liquid crystal display (LCD) devices have become increasingly popular in recent years as prices have fallen, the devices have become thinner and more lightweight, and the picture qualities have improved. LCD devices are generally categorized as either reflective or transmissive. Reflective LCDs tend to require less power since they lack an internal light source, and rely on ambient light reflected from the images displayed on the screen. Transmissive LCDs have an internal source of light, a back light, to produce brighter images.

Transmissive LCD devices typically include one or more array substrates, liquid crystal layers, color filter substrates, and electrode layers. Voltages may be applied to the electrode layers to generate an electric field between them and align the molecules of the liquid crystal layer(s). In this way, light from the back light passing through the liquid crystal forms images as seen from the front of the transmissive LCD device.

Materials in a liquid crystal state tend to exhibit characteristics of matter which are between the solid phase state (crystalline) and the liquid state (isotropic). Materials in a liquid state exhibit isotropic properties, that is, properties that are the same regardless of the direction of measurement. Materials in a solid state are anisotropic in that they tend to have properties which vary depending on the direction of measurement. The liquid crystal phase state is a thermodynamically stable phase which exhibits anisotropic properties due to the alignment and the shape of the molecules in the liquid crystal material. The temperature and concentration of a material in the liquid crystal state affects the material's phase state, thus affecting its properties. There are a number of distinct types of liquid crystal states.

One liquid crystal phase state, the nematic liquid crystal phase, has been studied extensively and is found in common use in a number of LCD applications such as the flat screen monitors for laptop computers. The molecules in a nematic liquid crystal phase do not have positional order relative to each other, but tend to be directionally oriented in one common direction, along the director. One class of the nematic liquid crystal phase state is chiral nematic, sometimes referred to as cholesteric. Materials in a cholesteric state have can selectively reflect one component of circularly polarized light.

Another liquid crystal phase state is the smectic phase. Molecules in the smectic phase state tend to be oriented in a common direction along a director, like nematic state molecules. However, unlike nematic molecules, smectic molecules also tend to be aligned in planes or layers. Hence, smectic molecules are more solid-like than nematic molecules. Different combinations of smectic layers and/or cholesteric layers may be combined with electrodes and other components in various manners to produce flat screen LCD devices with a variety of capabilities.

U.S. Pat. No. 6,549,261 ('261 patent), issued to Okada et al. features a reflective LCD having a cholesteric liquid crystal capable of selectively reflecting spectral rays of a specific visible wavelength. In the '261 patent, either a carrier layer or the cholesteric liquid crystal itself contains a coloring agent which absorbs wavelengths different from the reflected wavelength of the cholesteric liquid crystal. The device displays visible rays of a specific wavelength which are observed as a specific color. The devices may be stacked to produce red, green and blue in various combinations, as shown in FIG. 2 of the '261 patent, and herein in FIG. 1A.

U.S. Pat. No. 6,693,689 ('689 patent), issued to Kim et al. features a reflective LCD which includes a linear polarizer to convert natural light into linearly polarized light, and a retardation film to convert the linearly polarized light into circularly polarized light. The devices described in the '689 patent has a liquid crystal layer used to vary the phase of the light according to an applied electric field, and a cholesteric liquid crystal color filter to selectively reflect light received from the liquid crystal layer, along with a black background for absorbing light passing through the color filter. The device has pixels (or subpixels) dedicated to red, green and blue as shown in FIG. 12 of the '689 patent, and herein in FIG. 1B.

U.S. Pat. No. 6,580,482 ('482 patent) issued to Hiji et al. features a reflective multicolor LCD device that includes a cell 51 having a display layer 31 with a right-handed cholesteric liquid crystal for blue, a cell 53 having a display layer 33 with a left-handed cholesteric liquid crystal for green, a cell 57 having a display layer 37 with a right-handed cholesteric liquid crystal for yellow, and a cell 55 having a display layer 35 with a left-handed cholesteric liquid crystal for red. The various cell layers laminated in a stack to produce the multiple colors as shown in FIG. 1 of the '482 patent and herein in FIG. 1C.

SUMMARY

The present invention addresses these and other concerns. According to one aspect a single element full color display device using a cholesteric mixture is provided. It includes a first polarizing plate located to receive light from a light source, such as a white light backplane. A cholesteric mixture layer is located on the first polarizing plate and a first In-Plane Switching Mode liquid crystal layer is located on the cholesteric mixture layer. The first In-Plane Switching Mode liquid crystal has at least one transparent electrode located on at least one of upper and lower surfaces of the first In-Plane Switching Mode liquid crystal. A second polarizing plate is located on the first liquid crystal layer. A second liquid crystal layer is located on the second polarizing plate, and has at least one transparent electrode located on at least one of upper and lower surfaces of the second liquid crystal layer.

BRIEF DESCRIPTION OF THE DRAWINGS

The above and other objects, features, and advantages of the present invention will become more apparent in light of the following detailed description in conjunction with the accompanying drawings, in which like reference numerals identify similar or identical elements.

DETAILED DESCRIPTION

Exemplary embodiments of the present invention are described below with reference to the accompanying drawings. In the following description, well-known functions and/or constructions are not described in detail to avoid obscuring the invention in unnecessary detail.

Figure 1C:
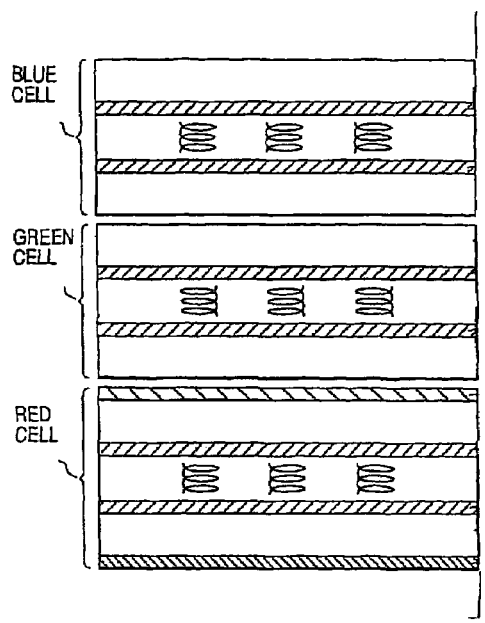
FIGS. 1A-C are illustrations of various layered LCD devices according to the related art.
Figure 1B:
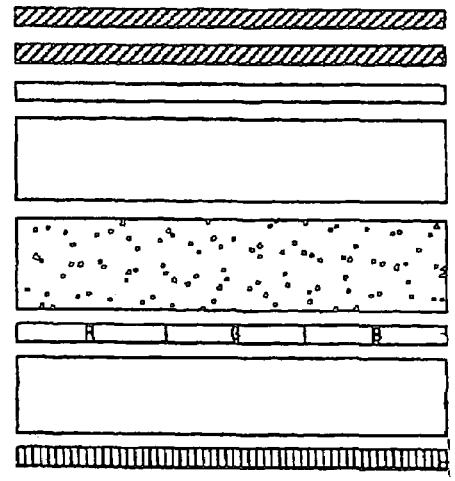
Figure 1A:
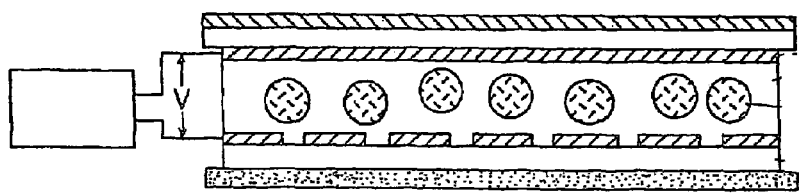
Figure 2:
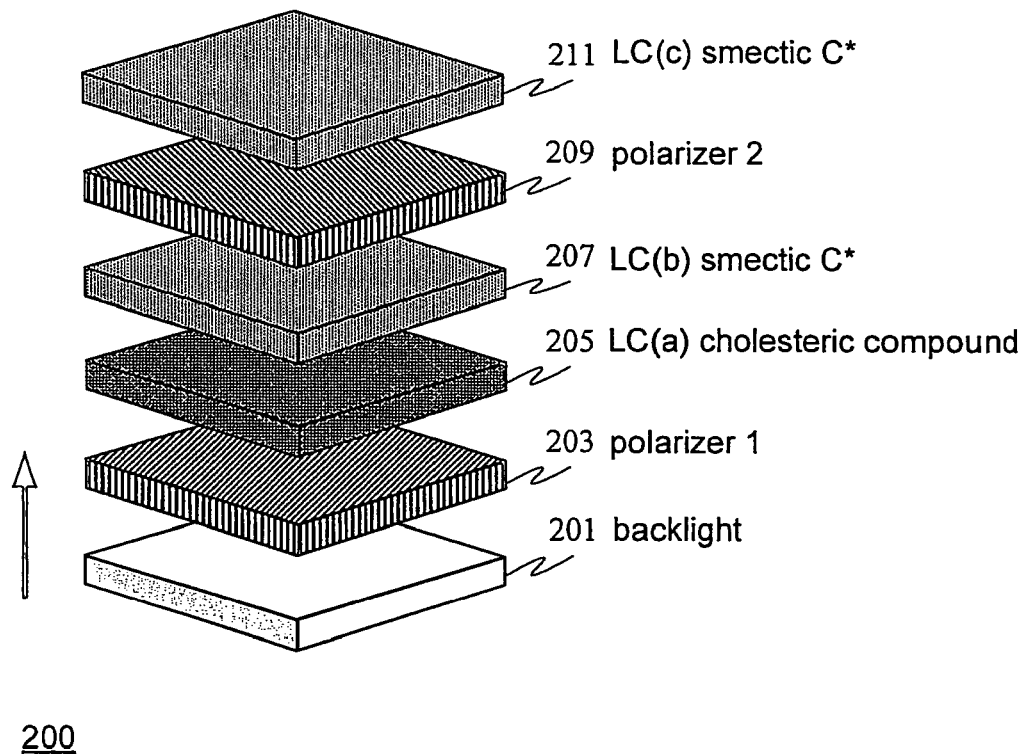
FIG. 2 illustrates various layers which may be included in embodiments of the present invention.

Turning to the drawings, FIG. 2 illustrates layers of an LCD device 200 included in various embodiments of the present invention. The layer 201 is a white light backplane, sometimes called a backlight layer. Since the LCD device 200 is a transmissive LCD it uses an internal source of light, the backlight layer 201. In general, a backlight such as backlight layer 201 allows a transmissive LCD device to produce images which appear brighter than the images of reflective LCD devices which have no backlight. In the embodiment shown in FIG. 2 the backlight layer 201 transmits light in the direction of the arrow into a polarizing layer 203.

Figure 5:
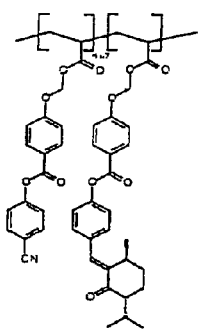
FIG. 5 depicts some exemplary dopants that may be used in implementing the cholesteric compound layer.
Figure 5:
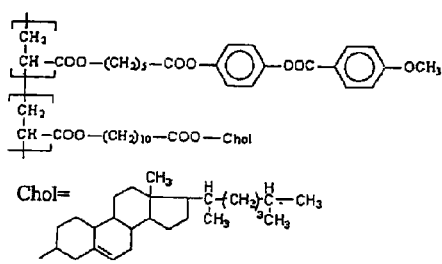
Figure 5:
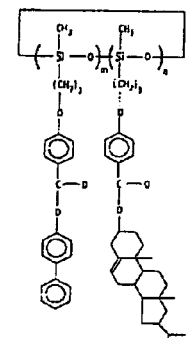
Figure 5:
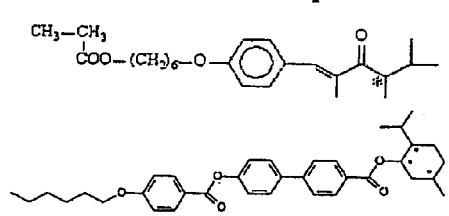
Figure 5:
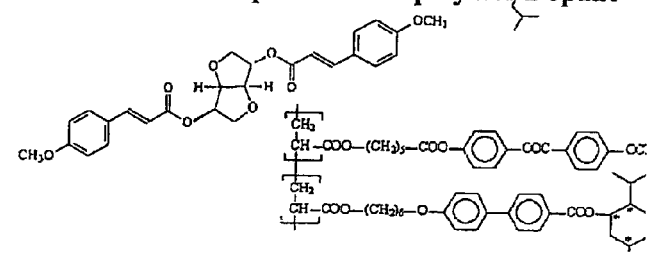

The first polarizer 203 sets the initial polarization of the light passing through the layers of LCD device 200. In an exemplary implementation the polarizer 203 is a linear polarizer to make the light linearly polarized one. The next layer, cholesteric compound layer 205, is a liquid crystal layer which includes a cholesteric compound through which light from the polarizing layer 203 passes. The LCD device 200 is arranged so that light travels in the direction of the arrow shown in FIG. 2, which is roughly perpendicular to the layers of the LCD device 200, including a light path which is substantially perpendicular to the cholesteric compound layer 205. In various embodiments of the invention the cholesteric compound layer 205 has a structure in which the molecules are arranged in layers within the layer 205. (The layers of molecules within the cholesteric compound layer 205 will be called "sublayers" herein to avoid confusion.) The molecules of any particular sublayer within the cholesteric compound 205 tend to point in the same direction along a director for that sublayer. As such, molecules which are side-by-side within the same sublayer tend to point in the same direction, the direction of the director for that sublayer. The closest adjacent molecules above and below a particular molecule (i.e., on adjacent sublayers) tend to have an orientation which is slightly rotated one way or the other—either right-handed or left-handed with respect to the light path. As light travels through the cholesteric compound layer 205 the light encounters molecules at each of the sublayers of molecules, each of the molecules along a given light path having an orientation slightly twisted (or rotated) with respect to the molecules in the sublayer above and below. Hence, the cholesteric compound layer 205 has a rotational structure in that the orientation of each sublayer of molecules encountered along a light path is rotated slightly. The rotational structure of the cholesteric compound layer 205 is defined by its pitch, which is the distance (perpendicular to the layers) it takes for the respective sublayer directors to rotate completely around along a light path through the various layers. The optical characteristics of the cholesteric compound layer 205 depend up the manufacturing process and dopants used in fabricating the layer. For example, FIG. 5 depicts some exemplary dopants that may be used in implementing the cholesteric compound layer 205.

Linearly polarized light passing through the cholesteric compound layer 205 becomes elliptically polarized except the light matching the pitch distance to become circularly polarized. The cholesteric compound layer 205 structurally defines a rotative feature along the light path with a definite pitch. Upon passing through the cholesteric layer, linearly polarized broadband light changes its phase depending on its wavelength according to the structural pitch. For example, for a half wavelength longer than the pitch distance a phase of light is delayed. Thus, the cholesteric compound layer 205 may cause the polarization to become elliptical, depending on the wavelength of light passing through it.

The molecular structure of the cholesteric compound used in the cholesteric compound layer 205 exhibits selective reflection characteristics. Some wavelengths of light passing through the cholesteric compound layer 205 tend to be reflected or absorbed, while other wavelengths of the light spectrum pass through the layer 205 with less reflection or absorption. Further, the cholesteric compound layer 205 acts as an elliptical polarizer on light passing through. In addition to being absorbed by varying amounts across the spectrum, the light passing through the cholesteric compound layer 205 becomes elliptically polarized by varying degrees as a function of its wavelength. That is, some of the light becomes elliptically polarized having a greater degree of angular rotation. Depending upon the characteristics of the layer 205 (e.g., the twist direction of the helical axis), the elliptical polarization may be either left-handed or right-handed.

Figure 3:
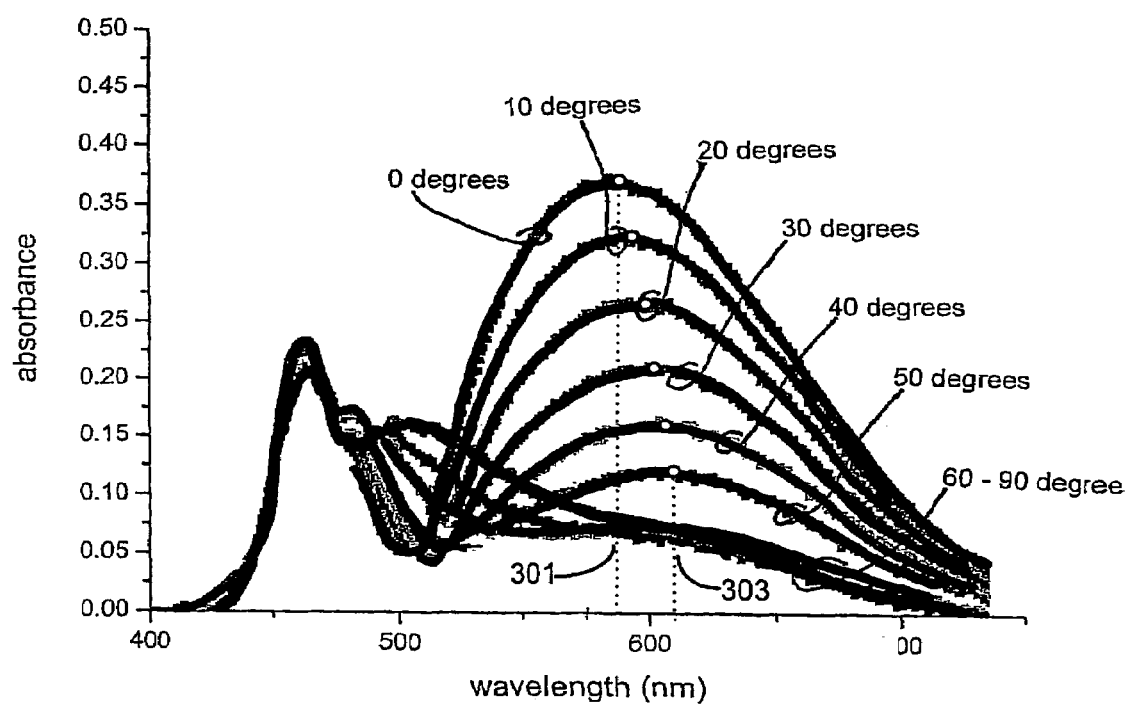
FIG. 3. is chart depicting an exemplary relationship between absorbance and wavelength of light passing through an LCD according an embodiment of the present invention.

FIG. 3 depicts an exemplary relationship for amount of absorbance across wavelengths of the visible spectrum for light passing through the cholesteric compound layer 205. For example, FIG. 3 could be the output from a system including a backlight 201, polarizer 1 203, cholesteric compound 205, and polarizer 2 209, with one of the polarizers being rotated to a certain extent. The output depicted in FIG. 3 may, or may not, include a smectic C* layer 207. The amount of absorbance depicted in FIG. 3 varies as a function of the degree of polarization—that is, as a function of the rotation of polarization. For example, at wavelengths above 525 nm 0 degrees polarized light is subject to less absorbance than light polarized at any other amount. As shown in the figure the peak absorbance versus the degree of polarization varies slightly. In this exemplary embodiment the peak absorbance for 0 degrees polarized light occurs at a wavelength of about 580 nm, as shown by the 301. The peak absorbance for 10 degrees polarized light (which is a lower curve than the 0 degrees curve) occurs at a slightly greater wavelength of about 585 nm. The peak absorbance for 50 degrees polarized light occurs at a wavelength of about 610 nm, as shown by the 303. The angles depicted in FIG. 3 represent relative angles between polarizer 1 203 and polarizer 2 209, without LC(b) smectic C* layer 207. FIG. 3 illustrates the transmittance results—that is, the transmitted spectra at the different relative angles. The original spectrum of backlight has been changed into one color oriented spectrum at each relative angle between polarizers 1 and 2. This kind of change of relative angle will be done by the LC(b) smectic C* layer 207, depending on the applied voltage. As discussed above, cholesteric compound tends to be more reflective than absorptive.

Returning to FIG. 2, the cholesteric compound layer 205 generates light for which a slightly different apparent color is associated with each of the curves having a different angular dependency (e.g., the 0 degree curve, the 10 degree curve, etc., as shown in FIG. 3). By "apparent color" it is meant that the colors appears as a particular color to the human eye even though the light producing the apparent color may contain various portions of the visible spectrum which includes light from approximately 380 nm to 780 nm. The visible light region can be broadly divided into red, green, and blue regions with wavelengths of approximately 660 nm (red), 530 nm (green), and 470 nm (blue). All visible materials all have an intrinsic wavelength which determines the apparent color that a human eye visualizes as the wavelength of the light reflected from or transmitted through the material. For example, a light may have the apparent color of purple as seen by a human eye even though it contains components of other colors which are not necessarily found in a light of the true color purple. Once light passes through the cholesteric compound layer 205 it is passed to layer 207 shown in FIG. 3.

Layer 207 is a smectic C* liquid crystal. In smectic liquid crystals the molecules tend to be aligned in planes or layers and are oriented in a common direction. In the smectic C phase, a layered mesophase is formed with directors that are tilted with respect to a direction normal to the layer itself. Smectic phase materials exhibit traits more like solids than liquids due to their crystalline molecular structure. In various embodiments of the present invention the layer 207 smectic C* liquid crystal may be configured to act as a polarizing filter which reduces or absorbs green light centered around approximately 530 nm in wavelength. The green light is reduced from the output of cholesteric compound layer 205 because the human eye tends to be most sensitive to the true color green. By removing, or reducing, this portion of the light spectrum, the layer 207 keeps the color green from overwhelming the output of the LCD device 200. This enhances the apparent colors which the LCD device 200 is capable of displaying. For example, the LCD device 200 may more readily display the color blue, a color which the human eye is less readily able to detect than green. The layer 207 may be implemented as an in-plane switching (IPS) LCD device that includes cholesteric liquid crystal (CLC) color filter. Although not shown in FIG. 2 the layer 207 may include a transparent conductive metal electrode layer one either side of it to bias and/or switch the device, thus controlling the light which passes through. Hence, layers 203, 205 and 207 constitute means for color selection.

Layer 209 of FIG. 2 is another polarizer layer. The liquid crystal smectic C* layer 207 might permit a range of polarization angles φ1. The second polarizer layer 209 acts as a means for purifying the color selection. In some embodiments, the polarizer 2 layer 209 may be omitted. In other embodiments, 209 is included, since LC(b) smectic C* layer 211 acts as a changer of linear polarization, but is sometimes limited in its ability to linearly polarize the light passing through. Further, the polarizer 2 layer 209 may tend to increase the contrast ratio or color purity. Layer 211 is another liquid crystal smectic C* layer. The layer 211 selectively transmits incident light based on its material characteristics. For example, if the molecular structure of the layer is characterized by a helical axis twisted in the right direction, the layer will reflect right-handed circularly polarized light. The pitch characteristic of liquid crystal may be controlled by biasing the liquid crystal material or subjecting it to electric fields having various waveforms. Since the pitch of a liquid crystal material determines the light that is transmitted through it (or reflected), the smectic C* liquid crystal color filter can be controlled to selectively transmit the amount of light of the desired wavelength, thus acting as a brightness or grey-scale control means. The layer 211 may be controlled by exposing it to an electric field. Although not shown in FIG. 2 the layer 211, like the layer 207, may include a transparent conductive metal electrode layer one either side of it to bias and/or switch the device to control the light passing through the layer 211. Referring back to the various layers depicted in FIG. 2, the layer 205 passes light in a spectrum of colors separated by polarization angle, the layer 207 may be controlled to select the angle so that a limited color range passes, layer 209 purifies the color, and layer 211 adjusts the brightness or grey-scale.

Figure 4:
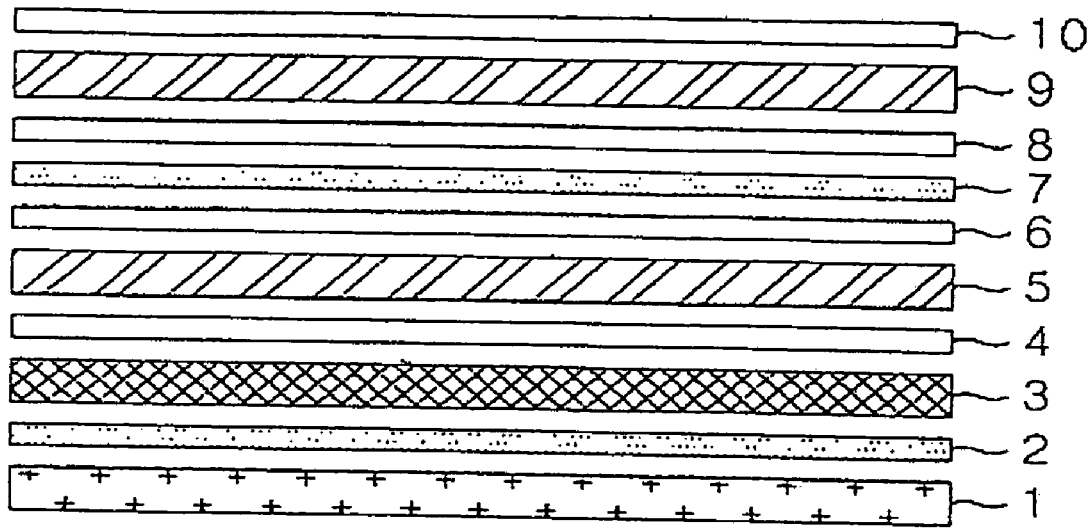
FIG. 4 illustrates additional embodiments of the present invention.
Figure 4:
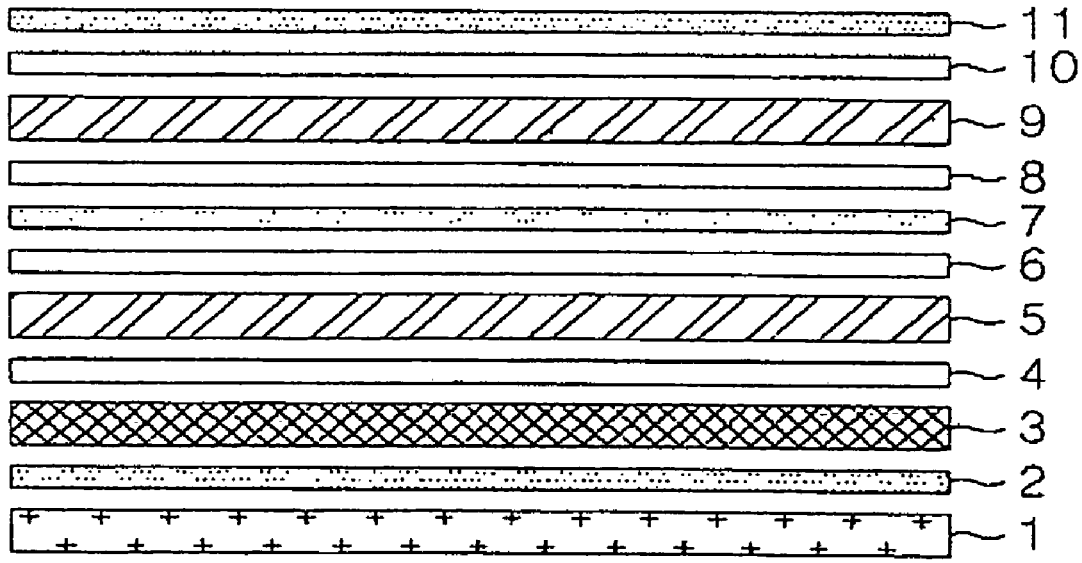

FIGS. 4A and 4B depict two implementations of the present invention. The implementation shown in FIG. 4A has ten layers. Layer 1 is a white backplane layer. Layer 2 is the first polarizer plate. Layer 3 is the cholesteric mixture layer. Layer 4 is the first transparent electrode. Layer 5 is the first liquid crystal layer. Layer 6 is the second transparent electrode. Layer 7 is the second polarizer plate. Layer 8 is the third transparent electrode. Layer 9 is the second liquid crystal layer. Layer 10 is the fourth transparent electrode. FIG. 4B has eleven layers, including the ten layers of FIG. 4A plus an eleventh layer of a third polarizing plate. FIGS. 4A and 4B illustrate a single display unit, which can be relatively large, but is likely to be a single pixel in a commercial implementation of a display device. As such, the display units or pixels would be separated into cells the electrodes of which can be separately driven. In this sense, the electrodes can be patterned to match the pixel layout, as known in the art.

The electrode layers—that is, layers 4, 6, 8 and 10—are made of a conductive, transparent material such as indium-tin-oxide (ITO) or other like material. Typically, one or more of the electrode layers are connected to power sources in order to produce an electric field between the electrode layers, thus controlling or affecting the optical characteristics of the intermediate layers disposed between the biased electrode layers. Either of the outermost electrodes 4, 10 can be reflective in a reflective LCD embodiment.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

Various embodiments of the invention have been described herein, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A single element color display device, comprising:
   a white light backplane;
   a first polarizing plate located adjacent the white light backplane;
   a cholesteric mixture layer located on the first polarizing plate;
   a first In-Plane Switching Mode liquid crystal layer located on the cholesteric mixture layer, and having at least one transparent electrode located on at least one of upper and lower surfaces of the first In-Plane Switching Mode liquid crystal;
   a second polarizing plate located on the first liquid crystal layer; and
   a second liquid crystal layer located on the second polarizing plate, and having at least one transparent electrode located on at least one of upper and lower surfaces of the second liquid crystal layer.

2. The display device according to claim 1, wherein the single element color display device is a single pixel.

3. The display device according to claim 1, further comprising:
   a third polarizing plate located above the second liquid crystal layer.

4. The display device according to claim 1, wherein the transparent electrodes of the first and second liquid crystal layers are located on upper and lower surfaces thereof, and the transparent electrodes are patterned to have an opposite polarity in the respective cells compartmented by a cell partition.

5. The display device according to claim 1, wherein the first and second liquid crystal layers are located between two sheets of upper and lower transparent substrates each having the transparent electrodes patterned thereon.

6. The display device according to claim 1, wherein the cholesteric mixture layer comprises a cholesteric mixture including a cholesteric liquid crystal compound and at least one of a dextroratatory dopant and a levorotatory dopant.

7. The display device according to claim 1, wherein the first In-Plane switching mode liquid crystal is a liquid crystal having a helical structure.

8. The display device according to claim 7, wherein the liquid crystal having a helical structure is a liquid crystal having a smectic C* phase.

9. The display device according to claim 1, wherein a switching range of the first liquid crystal layer overlaps with a polarizing range exhibiting a full color of the cholesteric mixture layer.

10. The display device according to claim 9, wherein the polarization direction of the second polarizing plate is within a polarization overlapping range exhibiting the full color of the cholesteric mixture layer and the first liquid crystal layer.

11. A single element color display device, comprising:
a white light backplane;
a first polarizing plate located on the white light backplane;
a cholesteric mixture layer located on the first polarizing plate;
a first liquid crystal layer located on the cholesteric mixture layer, and having transparent electrodes located on at least one of upper and lower surfaces of the first liquid crystal layer;
a second polarizing plate located on the first liquid crystal layer; and
a second liquid crystal layer located on the second polarizing plate, and having a transparent electrode located on the upper part thereof and sharing a lower transparent electrode with the first liquid crystal layer.

12. The display device according to claim 11, wherein the single element color display device is a single pixel.

13. The display device according to claim 11, further comprising:
a third polarizing plate located above the second liquid crystal layer.

14. The display device according to claim 11, wherein the first liquid crystal layer is located between two sheets of upper and lower transparent substrates each having the transparent electrodes patterned thereon.

15. The display device according to claim 11, wherein the cholesteric mixture layer comprises a cholesteric mixture including a cholesteric liquid crystal compound and at least one of a dextroratatory dopant and a levorotatory dopant.

16. The display device according to claim 11, wherein the first and second liquid crystal layers comprise liquid crystal having a helical structure.

17. The display device according to claim 16, wherein the liquid crystal having a helical structure is a liquid crystal having a smectic C* phase.

18. The display device according to claim 11, wherein a switching range of the first liquid crystal layer overlaps with a polarizing range exhibiting the full color of the cholesteric mixture layer.

19. The display device according to claim 18, wherein the polarization direction of the second polarizing plate is within a polarization overlapping range exhibiting the full color of the cholesteric mixture layer and the first liquid crystal layer.

20. A single element color display device, comprising:
a white light backplane;
a first polarizing plate located on the white light backplane;
a second In-Plane Switching Mode liquid crystal layer located on the first polarizing plate, and having at least one transparent electrode located on at least one of upper and lower surfaces thereof;
a cholesteric mixture layer located on the second liquid crystal layer;
a first In-Plane Switching Mode liquid crystal layer located on the cholesteric mixture layer, and having at least one transparent electrode located on at least one of upper and lower surfaces thereof; and
a second polarizing plate located on the first liquid crystal layer.

21. The display device according to claim 20, further comprising:
a third polarizing plate between the second liquid crystal layer and cholesteric mixture layer.

22. The display device according to claim 20, wherein the cholesteric mixture layer comprises a cholesteric mixture including a cholesteric liquid crystal compound and at least one of a dextroratatory dopant and a levorotatory dopant.

23. The display device according to claim 20, wherein In-Plane Switching Mode liquid crystals of the first and second liquid crystal layers are liquid crystals having a helical structure.

24. The display device according to claim 23, wherein the liquid crystal having a helical structure is a liquid crystal having a smectic C* phase.

25. The display device according to claim 20, wherein a switching range of the first liquid crystal layer overlaps with a polarizing range exhibiting a full color of the cholesteric mixture layer.

26. The display device according to claim 25, wherein a polarization direction of the second polarizing plate is within a polarization overlapping range exhibiting the full color of the cholesteric mixture layer and the first liquid crystal layer.

* * * * *